Patented Apr. 4, 1944

2,345,826

UNITED STATES PATENT OFFICE 2,345,826

RECOVERY OF ALKALI METAL CYANATES

Hans R. Neumark, Forest Hills, N. Y., assignor to General Chemical Company, New York, N. Y., a corporation of New York No Drawing. Application April 29, 1941, Serial No. 390,909

4 Claims. (Cl. 23—75)

This invention relates to a method for the recovery of alkali metal cyanates from materials containing such compounds. More particularly, this invention relates to a method for the purification of alkali metal cyanates by crystallization.

As is well known, alkali metal cyanates may be manufactured in a variety of ways. The most common method for the manufacture of these compounds involves oxidation of an alkali metal cyanide at elevated temperatures with lead oxide. These cyanates may also be prepared by reaction of alkali metal carbonates with urea at elevated temperatures or by the reaction of alkali metal carbonates with a gaseous mixture of ammonia and carbon dioxide at elevated temperatures. Alkali metal cyanates may also be manufactured by controlled oxidation of alkali metal cyanides with oxygen-containing gases as described in the copending application of Hans R. Neumark and John H. Pearson Serial No. 390,910, filed Apr. 29, 1941, which discloses oxidizing a molten alkali metal cyanide by contact with an oxygen containing gas at a temperature below about 700° C., the oxidation being terminated while the reaction mass has a cyanide content of not less than 2%. In practically all these methods the cyanates are obtained in admixture with other substances, particularly carbonates, and, therefore, it is generally desirable to purify them, usually by recrystallization. Because of the fact that alkali metal cyanates upon contact with water undergo hydrolytic decomposition to form carbonates, it has been the practice to purify crude cyanates by crystallization from non-aqueous media such as alcohols in order to avoid substantial loss of product. However, the use of alcohols and other non-aqueous media for this purpose is somewhat disadvantageous since impurities such as alkali metal carbonates present in the crude cyanates are also relatively insoluble in such media and tend to crystallize along with the cyanates, thereby contaminating the desired product; furthermore, the use of alcohols usually requires the employment of expensive recovery units designed to prevent undue evaporation and loss of the alcohol employed. Hence, from both an economic and technical standpoint crystallization of the cyanates from aqueous media would be preferable if decomposition of the cyanate could be avoided.

German Patent 180,925 of 1907 indicates that decomposition of alkali cyanates in aqueous media may be inhibited by incorporating in the solution a small amount of a caustic alkali. Extensive experimentation in this field has revealed that the addition to aqueous solutions of alkali metal cyanates of small amounts of strong alkali does not retard decomposition of the cyanate sufficiently to permit crystallization thereof from the aqueous media on a commercial scale. Notwithstanding that the disclosure of this German patent has been available since 1907, alkali cyanates have to the best of my knowledge been produced commercially prior to my invention by crystallization from alcohol.

It is an object of this invention to provide a simple and effective process for the crystallization of alkali metal cyanates from aqueous media.

It is a more specific object of this invention to provide a process for the crystallization of alkali metal cyanates from water, which process substantially avoids decomposition of the cyanate during crystallization.

I have made the surprising discovery that alkali metal cyanates may be crystallized from solutions thereof in aqueous media without substantial hydrolytic decomposition thereof by effecting the crystallization in the presence of at least about one-half mol of a strong alkali per liter of solution. My observations have indicated that it is important that at least about one-half mol of a strong alkali per liter be present since attempts to crystallize cyanates from aqueous media having alkali contents substantially below this point result in marked loss of the cyanates by hydrolytic decomposition to the carbonates. My invention may be most conveniently accomplished by taking up the mass from which the cyanate is to be crystallized in hot water containing at least about one-half mol of an alkali metal hydroxide per liter so as to form a substantially saturated solution of the cyanate in the hot water, then cooling the solution to cause the cyanate to crystallize therefrom, and separating the crystals from the mother liquor. A preferred feature of my invention involves employing the mother liquor separated from the cyanate crystals in the manner above described as the aqueous medium in which is dissolved the next batch of crude cyanate to be purified in accordance with this invention and periodically removing from the mother liquor thus employed carbonates which tend to build up therein upon continued use. However, aqueous media other than the mother liquors may be employed with equal success provided their alkali content is adjusted to the proper point. By operating in accordance with my invention, recovery of cyanates in substantially pure condition and in excellent yields may readily be achieved. Furthermore, the employment of water instead of alcohols effects considerable economies and simplifies operating technique.

In carrying out my invention, the alkali metal cyanate-containing mass in either solid or molten condition may be dissolved in a hot aqueous medium, said medium containing at least one-half mol per liter of a strong alkali. My invention is applicable to the recovery of cyanates from any water-soluble mass containing substantial amounts thereof; it is preferably applied, however, to the separation of alkali metal cyanates from the corresponding carbonates and other ingredients present in crude cyanates produced as above described. The temperature of the aqueous medium used to dissolve the cyanate may vary, but temperatures between about 80° and about 90° C. are usually appropriate. The quantity of the aqueous medium employed is preferably sufficient to form a substantially saturated solution of the cyanate at the elevated temperatures but somewhat greater amounts may be used, if desired, as long as cyanate crystals will separate from the solution on cooling. If ordinary water is employed to dissolve the cyanate, at least one-half mol per liter, and preferably between about 0.6 and about 0.7 mol per liter, of a strong alkali, e. g. the hydroxide of the alkali metal contained in the cyanate, should be added thereto prior to dissolution of the cyanate-containing mass therein, so that the cyanate solution produced will have the desired alkali content; for example, if potassium cyanate is to be treated, sufficient potassium hydroxide to form a 3% to 5% solution thereof may be added to the water, whereas if sodium cyanate is being purified, an amount of sodium hydroxide sufficient to form a 2% to 4% solution is suitable. However, if mother liquor from a previous crystallization is being employed as the aqueous medium, as is preferred, sufficient alkali is ordinarily still present therein so that the addition of amounts of strong alkali considerably less than those necessary in the case of pure water produces the desired alkali content in the cyanate solution; in some cases no additional alkali need be added to mother liquors before re-use.

The substantially saturated hot cyanate solution obtained as above described may be clarified, if necessary, by filtration and may then be permitted to cool in order to cause the cyanate to crystallize therefrom. The temperature to which the hot saturated solution is cooled may vary widely, but generally temperatures in the neighborhood of about 20° C. or below are suitable. It will be found that cyanate crystals separate from the solution in excellent yields and in substantially pure form; these crystals may be removed from the mother liquor by filtration or centrifuging and then dried, whereby a cyanate product suitable for any desired use may be obtained.

As hereinabove stated, a preferred feature of my invention involves employing the mother liquor separated from the cyanate crystals as above described as the medium in which is dissolved the next batch of crude cyanate to be purified; furthermore, since continued re-use of the mother liquors for this purpose causes a gradual increase in the carbonate content thereof, it is preferable when operating in this manner to periodically remove these carbonates from the mother liquor thus used in any suitable manner. Removal of the carbonates may, for example, be effectively accomplished by treating the mother liquor separated from the cyanate crystals with an alkaline earth hydroxide, e. g. barium hydroxide, and separating the alkaline earth carbonate precipitate thus formed; the alkali generated by the reaction of the carbonate with barium hydroxide tends to replace any alkali lost by reason of continued re-use of the mother liquor. The carbonates may be removed after separation of each batch of cyanate crystals or the mother liquor may be re-used several times as hereinabove described, and the carbonates permitted to build up therein until their concentration is such that the purity of the cyanate crystals is detrimentally affected; generally, the carbonate content of the mother liquor should not be permitted to exceed about 20 grams per 100 cc. Removal of the carbonates from the mother liquors as described permits re-use of the mother liquors as many times as desired, thereby effecting considerable economy in operation.

My extensive work in this field has shown conclusively that by operating in accordance with my invention the cyanates may be recrystallized from aqueous media without substantial loss thereof by hydrolytic decomposition, whereas crystallization of the cyanates from aqueous solutions containing alkali in amounts less than those mentioned above inevitably results in considerable loss of product. For example, two saturated aqueous solutions of pure potassium cyanate, containing 1% and 3% potassium hydroxide respectively, were prepared at a temperature of 90° C. The solutions thus formed were then cooled to about 20° C., whereby crystallization of the cyanate occurred. The crystals obtained from the solution containing 1% potassium hydroxide were analyzed and were found to contain only 65% potassium cyanate, the remainder being chiefly potassium carbonate. On the other hand, analysis of the crystals obtained from the 3% potassium hydroxide solution showed that these crystals contained 96.5% potassium cyanate. These tests furnish striking evidence of the extent to which hydrolytic decomposition of the cyanate occurs in the presence of amounts of strong alkali less than about one-half mol per liter and show clearly why the art has not benefited from the disclosure of the German patent above referred to. The process of my invention, on the other hand, prevents any substantial decomposition of the cyanates and thus provides a commercially practical mode of operation.

The following examples are illustrative of my invention. Amounts are given in parts by weight.

*Example 1.*—Crude potassium cyanate was prepared by melting potassium cyanide at a temperature of about 650° C. in a Monel metal container, agitating the melt while slowly bubbling air therethrough until the cyanide content of the melt was reduced to about 2%, and then permitting the melt to solidify; the product contained about 85% potassium cyanate and about 12% potassium carbonate, the balance being chiefly potassium cyanide. The mass was divided into five equal parts and one of these parts was dissolved in water containing about 5% potassium hydroxide at a temperature of about 90° C., the amount of water employed being sufficient to form an approximately saturated solution of the cyanate. The solution was then cooled to 20° C., the cyanate crystals separated therefrom, the mother liquor treated with barium hydroxide to remove the carbonate therefrom, heated to 90° C., and another part of the crude cyanate mass was dissolved therein and crystallized as described. These operations were repeated until all five parts of the cyanate-containing mass had been purified, the mother liquor from each crystallization being treated to remove the carbonate and then employed to dissolve the next batch of crude cyanate. The following table shows the analysis of the crystals obtained upon these five crystallizations:

| Run | Crystals | | |
|---|---|---|---|
| | KCNO | $K_2CO_3$ | KCN |
| | Per cent | Per cent | Per cent |
| 1 | 96.9 | 1.5 | 0.2 |
| 2 | 96.9 | 2.0 | 0.3 |
| 3 | 95.3 | 1.9 | 0.2 |
| 4 | 97.5 | 2.3 | 0.2 |
| 5 | 96.3 | 2.8 | 0.2 |

*Example 2.*—Crude potassium cyanate, prepared as described in Example 1, was divided into eleven equal portions and one portion was dissolved in water containing 5% potassium hydroxide at a temperature of about 90° C. in amounts sufficient to form a substantially saturated cyanate solution; the solution was then cooled to 20° C., whereby potassium cyanate crystals separated and were removed. The mother liquor was then heated to 90° C. and used to dissolve another portion of the crude cyanate product; this solution was cooled as above described and crystals separated therefrom. These operations were repeated until ten of the eleven portions of the crude cyanate had been purified; after the tenth run, carbonates were removed from the mother liquor by reaction with barium hydroxide and the mother liquor then employed for purifying the last portion of the crude cyanate. The following table shows the cyanate content of the crystals recovered; it will be noted that the removal of carbonates from the mother liquor after the tenth run effected a substantial reduction in the carbonate content of the cyanate crystals recovered from the subsequent crystallization:

| Run | Crystals | | |
|---|---|---|---|
| | KCNO | $K_2CO_3$ | KCN |
| | Per cent | Per cent | Per cent |
| 1 | 97.69 | 2.00 | 0.14 |
| 3 | 96.90 | 2.65 | 0.17 |
| 6 | 95.62 | 3.77 | 0.20 |
| 10 | 95.55 | 4.06 | 0.41 |
| 11 | 95.78 | 2.58 | 0.40 |

From the above description it will be evident that my invention provides a simple and effective method of purifying crude alkali metal cyanates. Because of its simplicity and economy, my invention should find extensive use in this art.

Since certain changes may be made in carrying out the above method without departing from the scope of the invention, it is intended that all matter contained in the above description shall be interpreted as illustrative and not in a limiting sense.

I claim:

1. A method for the purification of a crude alkali metal cyanate produced by the oxidation of a molten alkali metal cyanide by contact with an oxygen-containing gas at a temperature below about 700° C., the oxidation being terminated while the reaction mass still contains not less than 2% of the cyanide, which comprises crystallizing the crude cyanate from an aqueous medium containing between about 0.6 and about 0.7 mol of an alkali metal hydroxide per liter.

2. A method for the purification of a crude alkali metal cyanate produced by the oxidation of a molten alkali metal cyanide by contact with an oxygen-containing gas at a temperature below about 700° C., the oxidation being terminated while the reaction mass still contains not less than 2% of the cyanide, which comprises dissolving the crude cyanate in a hot aqueous medium containing between about 0.6 and about 0.7 mol of an alkali metal hydroxide per liter so as to form a solution substantially saturated with respect to the cyanate and cooling the solution to crystallize the cyanate therefrom.

3. A method for the purification of crude potassium cyanate produced by the oxidation of molten potassium cyanide by contact with an oxygen-containing gas at a temperature below about 700° C., the oxidation being terminated while the reaction mass still contains not less than 2% of the cyanide, which comprises dissolving the crude potassium cyanate in a hot aqueous medium containing between about 3% and about 5% potassium hydroxide so as to form a solution substantially saturated with respect to the cyanate, and cooling the solution to crystallize the cyanate therefrom.

4. A method for the purification of crude sodium cyanate produced by the oxidation of molten sodium cyanide by contact with an oxygen-containing gas at a temperature below about 700° C., the oxidation being terminated while the reaction mass still contains not less than 2% of the cyanide, which comprises dissolving the crude sodium cyanate in a hot aqueous medium containing between about 2% and about 4% sodium hydroxide so as to form a solution substantially saturated with respect to the cyanate, and cooling the solution to crystallize the cyanate therefrom.

HANS R. NEUMARK.